Aug. 24, 1943. G. S. HOUGHLAND 2,327,896
METHOD OF STRIPPING ENRICHED ABSORBENT MEDIUM
Filed Aug. 31, 1940
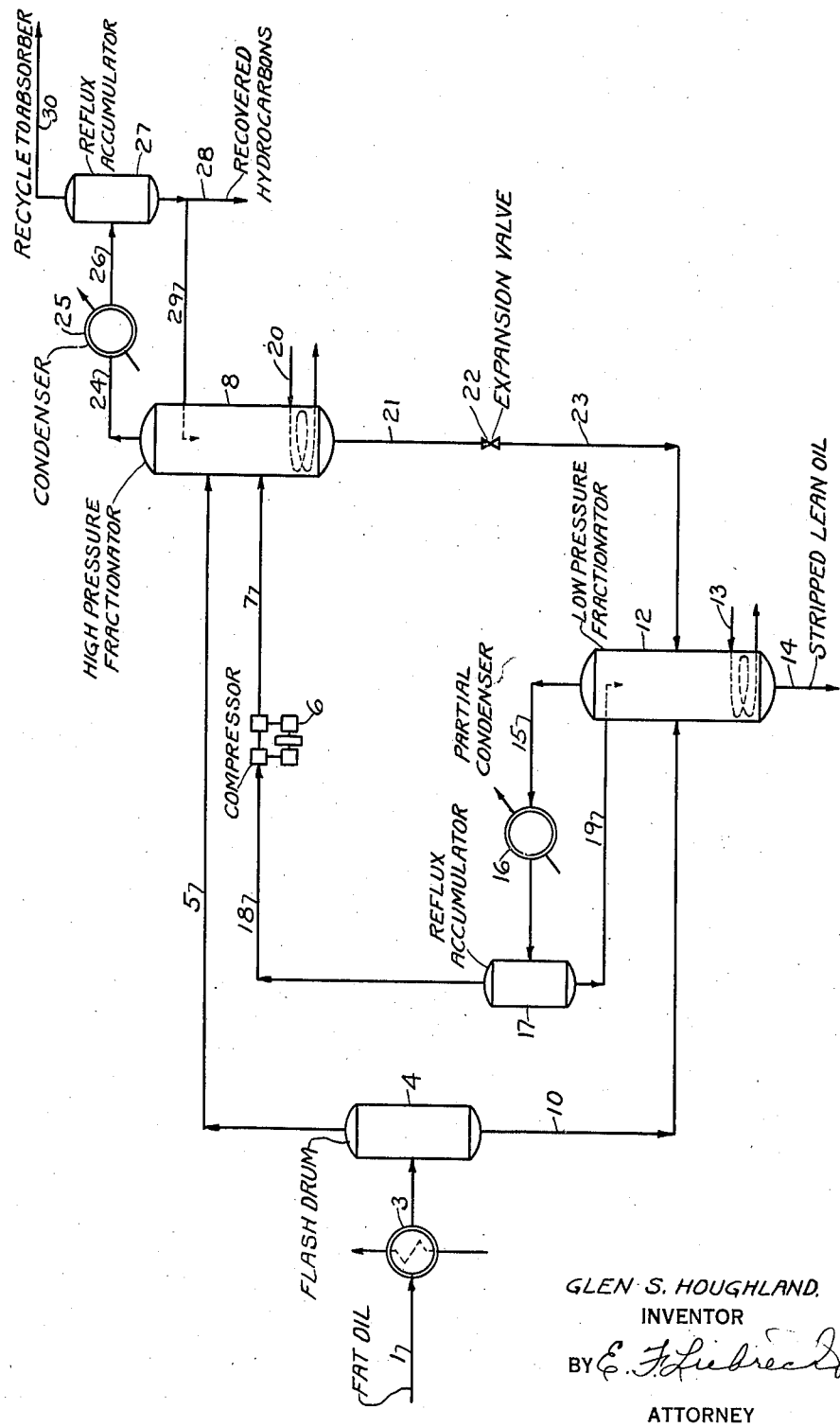
GLEN S. HOUGHLAND,
INVENTOR
BY E. F. Liebrecht
ATTORNEY Patented Aug. 24, 1943

2,327,896

UNITED STATES PATENT OFFICE 2,327,896

METHOD OF STRIPPING ENRICHED ABSORBENT MEDIUM

Glen S. Houghland, New York, N. Y., assignor to The M. W. Kellogg Company, Jersey City, N. J., a corporation of Delaware Application August 31, 1940, Serial No. 354,997

2 Claims. (Cl. 196—8)

This invention relates to the recovery of propane and similar light hydrocarbons from gases by absorption, and is especially concerned with a process for stripping recovered hydrocarbons from an oil which has been enriched therewith in an absorber.

The stripping operation which must always complement an absorption step in a hydrocarbon recovery process should accomplish the complete isolation of the absorbed hydrocarbons from the absorption medium. If the absorption medium is not thoroughly denuded of recovered hydrocarbons, its absorbing capacity will be impaired, while the presence of absorption medium in the finally recovered hydrocarbons is undesirable if only for the reason that it constitutes a loss of medium from the process.

Heretofore when propane has been recovered by absorption it has been customary to conduct stripping operations under pressures of 200 to 400 pounds per square inch, which necessitates heating the enriched oil to a temperature of 500° F. or higher if complete removal of light hydrocarbons is to be accomplished efficiently. The latter temperature level can seldom be attained except by means of a furnace or tube-still, which contributes greatly to the cost of a stripping unit.

The main object of my invention is to provide a method of stripping enriched or "fat" absorption oil wherein the temperatures employed are attainable by heat exchange with steam at the commonly available pressure of 150 to 175 pounds per square inch. Such steam is usually used for other purposes in the natural gasoline plants and refineries where hydrocarbon recovery is practiced, so that by my method the construction of a furnace as part of the stripping equipment can frequently be avoided. The relatively low temperatures necessary with my method also eliminate the need for expensive hot-oil-circulating pumps and numerous heat exchangers, and retard the deterioration of the absorption oil due to gum formation.

In general terms, the method of my invention comprises subjecting an enriched absorption oil to flash distillation to separate light hydrocarbons from absorption oil roughly and without intending to obtain either entirely free from the other. This initial flash may be effected at any desired pressure consistent with the requirement that the temperature of the oil be held below about 400° F. and that the bulk of the light hydrocarbons be taken overhead.

The liquid remaining unvaporized in the preliminary separation, consisting of the bulk of the absorption oil in an incompletely stripped condition, is transferred to an atmospheric or low pressure fractionating zone where complete volatilization of recovered hydrocarbons is effected. Because of the low pressure, it is possible to strip the absorption oil completely at a relatively low temperature—not, however, without carrying light ends of the oil overhead with the stripped vapors. As will be understood from the hereinafter given description of subsequent steps, the quantity of light ends thus vaporized is constant and is continuously returned, so that in actuality the stripped liquid includes the whole of the absorption oil charged. This liquid, after cooling, is ready to be used for the absorption of additional quantities of hydrocarbons.

Hydrocarbons and light ends stripped out in the preceding step are introduced into a high pressure fractionating zone as are the vapors from the preliminary flash separation. The materials entering the high pressure fractionating zone thus include all the recovered hydrocarbons plus light ends of the absorber oil. At the high pressure, the latter materials may be excluded from the overhead distillate and are collected in the bottom product, and the overhead distillate is readily condensed at normal cooling water temperatures. The overhead distillate consists solely of recovered hydrocarbons completely free of absorption oil fractions, but this result is not attained without leaving some light hydrocarbons in the bottoms. As will be understood from the further description which follows, the quantity of recovered hydrocarbons withdrawn in the bottoms from the high pressure fractionating zone is constant and is continuously returned thereto so that in actuality the overhead vapors include all the recovered hydrocarbons. The said vapors are withdrawn as the desired product. The bottoms liquid collected in the high pressure fractionation zone, consisting of light fractions of absorber oil and a small amount of recovered hydrocarbons, is then passed to the low pressure fractionating zone. Since the liquid withdrawn from the latter zone is the stripped absorber oil, and the vapors therefrom are passed to the high pressure zone from which recovered hydrocarbons are taken, it will be seen that, as previously stated, the recycling of constant quantities of vaporized light ends and condensed light hydrocarbons is achieved. The temperatures maintained in the high pressure fractionating zone are of the same magnitude as those in the low-pressure fractionating zone.

The annexed drawing to which reference will now be made is a diagrammatic flow sheet of one embodiment of my invention.

In the drawing, a stream of absorption oil enriched with light hydrocarbons from an absorber is introduced into line 1 and passed therethrough to a flash drum or preliminary separator 4. The stream traversing line 1 is brought by means of heat exchanger 3 to a temperature not higher than about 400° F., and the pressure in flash drum 4 is made low enough to insure vaporization of the major portion of the light hydrocarbons in the entering oil stream at the chosen temperature. It will be understood that the number of combinations of temperature and pressure capable of satisfying the latter requirement is infinite, and that the higher the temperature selected, the higher may be the pressure. A temperature between about 150° F. and that of the hottest heating medium which may happen to be available is preferable, but as previously mentioned, an upper limit of about 400° F. is adhered to in any case.

Liquid remaining unvaporized in the flash drum comprising the bulk of the absorption oil in an incompletely stripped condition is collected and withdrawn through line 10 and passed to a fractionating column 12 equipped with a reboiler 13, the latter suitably taking the form of a steam-heated coil in the base of the column. The column is maintained under a pressure not higher than about 50 pounds per square inch, which is low enough to permit stripping the absorption oil completely without employing temperatures above about 400° F. Stripped absorption oil is withdrawn from the base of fractionator 12 through line 14 and when cooled is ready for reuse in an absorber.

Overhead vapors from fractionator 12 go via line 15 to a partial condenser 16 and the therein produced vapor-condensate mixture continues to a reflux accumulator 17 wherein vapor disengagement takes place. Condensate is returned via line 19 to the top of fractionator 12 as reflux while vapor is withdrawn through line 18 and passed via line 7 to a high-pressure fractionating column 8. Vapors from the flash drum 4 also travel via line 5 to the high-pressure column 8. Fractionator 8 will in all cases be at a higher pressure than column 12, so that a compressor 6 is necessary between lines 18 and 7 to raise the pressure of the vapor passing therethrough. In the event that flash drum 4 is operated at a lower pressure than column 8, a compressor will be necessary to pressure the vapors traversing line 5 also.

Column 8 is provided with a suitable reboiler coil 20 whereby its bottom temperature is maintained as high as is consistent with the temperature of the available heating medium but not above about 400° F. This column is maintained under sufficient pressure to enable the desired recovered hydrocarbons to be condensed at cooling water temperature, normally between 200 and 350 pounds per square inch.

Because of the relatively high pressure in fractionator 8, it is possible to drive the light absorption oil fractions into the bottoms by means of reflux and to withdraw an overhead product which consists solely of light hydrocarbons. These pass off through line 24 to condenser 25, the condensate being collected in accumulator 27. A portion for reflux purposes is returned through line 29 to the top of fractionator 8 and the remainder withdrawn through line 28 for use as the desired product. If any excessively light hydrocarbons such as methane and ethane were picked up by the absorption oil along with those desired to be recovered they will remain as a vapor above the liquid in the accumulator 27 and as such a vapor would contain small amounts of heavier hydrocarbons it could advantageously be returned to an absorber via line 30.

The bottoms product from fractionator 8, consisting of light fractions derived from the absorption oil and heavier recovered hydrocarbons, is withdrawn through line 21 and after expansion through valve 22 is carried by line 23 back to the low pressure fractionator 12.

It will be seen from the foregoing exemplary embodiment and general description that absorber oil may be stripped by my method in a relatively simple, easily controllable manner which is adaptable to a wide range of hydrocarbon recovery conditions and which employs temperatures attainable by heat transfer from commonly available heating media.

By my method the final isolation of light hydrocarbons free from absorption oil and of absorption oil free from light hydrocarbons are carried out in separate steps, each under a pressure especially suited thereto. It will be understood that the flow sheet showing one embodiment of my invention is purely diagrammatic and that the invention is capable of many refinements which will readily occur to those skilled in the art; for example, economy of heat may be enhanced by exchanging heat between streams of materials being processed. Also, stripping may be accomplished more effectively in both the low pressure zones by injecting superheated steam directly into the bottoms products collected therein.

I claim:

1. A method of separating light hydrocarbons from an absorption oil which has been enriched therewith by contact with a hydrocarbon-containing gas including the steps of flashing enriched absorption oil to produce a vapor containing most of the light hydrocarbons originally present in the enriched oil but not entirely free from light fractions of the oil itself and a liquid containing most of the absorption oil but not entirely free of light hydrocarbons, passing said liquid to a first fractionating zone and therein stripping substantially all the remaining light hydrocarbons out of said liquid at a temperature not higher than about 400° F. and under a pressure low enough to permit said stripping at the prevailing temperature, withdrawing stripped absorption oil as a bottoms product from said first zone, withdrawing an overhead vaporous product from said first zone consisting of light hydrocarbons and light fractions of absorption oil, introducing at least a part of said overhead product in vaporous condition and flash-vaporized material from said flashing step into a second fractionating zone, maintaining in said second fractionating zone a pressure higher than that existing in said first zone, fractionating said overhead product and flash-vaporized material in said second fractionating zone to obtain a bottoms liquid, including light hydrocarbons and light absorption oil fractions, separate from said liquid produced in said flashing step and overhead vapors consisting of light hydrocarbons free of absorption oil constituents, separately withdrawing said overhead vapors and said bottoms liquid from said second fractionating zone and introducing the latter into said first fractionating zone.

2. A method as in claim 1 in which the pressure in said first fractionating zone is not higher than about 50 pounds per square inch and the pressure in said second fractionating zone is between about 200 and about 350 pounds per square inch.

GLEN S. HOUGHLAND.